United States Patent [19]

Kawamura et al.

[11] Patent Number: 4,553,036
[45] Date of Patent: Nov. 12, 1985

[54] INFORMATION DETECTING APPARATUS

[75] Inventors: Naoto Kawamura, Inagi; Kazuya Matsumoto, Yokohama, both of Japan

[73] Assignee: Canon Kabushiki Kaisha, Tokyo, Japan

[21] Appl. No.: 606,158

[22] Filed: May 2, 1984

Related U.S. Application Data

[60] Division of Ser. No. 464,579, Feb. 7, 1983, Pat. No. 4,467,195, which is a continuation of Ser. No. 244,259, Mar. 16, 1981, abandoned, which is a continuation of Ser. No. 967,392, Dec. 7, 1978, abandoned.

[30] Foreign Application Priority Data

| Dec. 8, 1977 | [JP] | Japan | 52-147600 |
| Dec. 8, 1977 | [JP] | Japan | 52-147601 |
| Jul. 5, 1978 | [JP] | Japan | 53-81792 |
| Dec. 2, 1978 | [JP] | Japan | 53-149204 |

[51] Int. Cl.[4] .......................... H01J 40/14
[52] U.S. Cl. ........................ 250/578; 250/216
[58] Field of Search .............. 250/211 R, 211 J, 227, 250/578, 216, 568, 569, 566, 555; 358/212, 213, 293, 294; 357/30, 31, 32; 235/462, 472, 473

[56] References Cited

U.S. PATENT DOCUMENTS

| 3,320,429 | 5/1967 | McGregor | 250/227 |
| 3,523,191 | 8/1970 | Street | 250/219 |
| 3,544,713 | 12/1970 | Case | 358/213 |
| 3,581,100 | 5/1971 | Milford | 250/227 |
| 3,894,216 | 7/1975 | Bottles | 250/555 |
| 3,914,309 | 10/1975 | Swensen | 250/578 |
| 4,179,621 | 12/1979 | Crean et al. | 250/566 |
| 4,446,364 | 5/1984 | Hayashi et al. | 358/213 |

Primary Examiner—David C. Nelms
Attorney, Agent, or Firm—Fitzpatrick, Cella, Harper & Scinto

[57] ABSTRACT

This specification discloses an original reading apparatus for converting information such as pictures an writings on an original surface into electrical signals for reading. The apparatus comprises a carriage for moving an original in a predetermined direction, an illuminating system for illuminating a narrow line on the original perpendicular to the direction of movement of the original, a photoelectric sensor including a plurality of photoelectric elements arrayed in the direction of the illuminated line and over the width of the original, and means for reading the signals provided on each photoelectric conversion surface in the fashion of time series. In the apparatus, the illuminating system and the photoelectric sensor are made integral to form a compact head, and the head can scan the original while being in intimate contact with the original to thereby produce information signals of high resolution.

1 Claim, 20 Drawing Figures

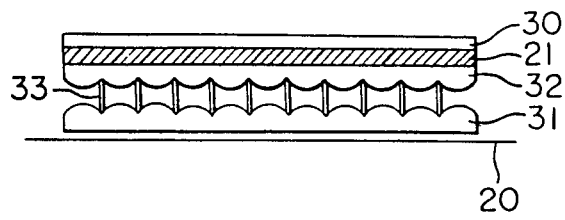
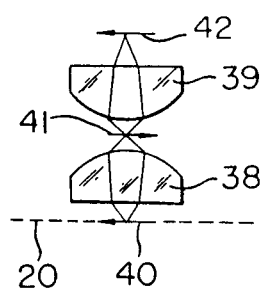
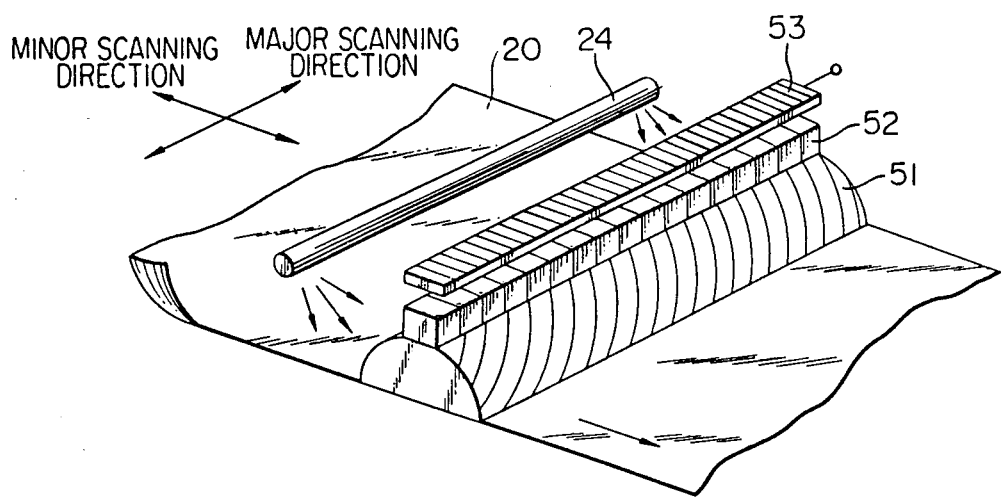
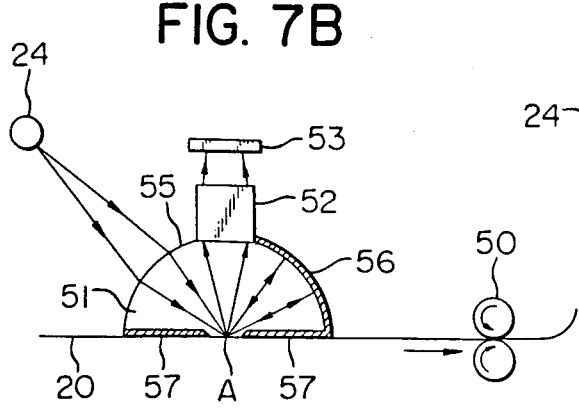
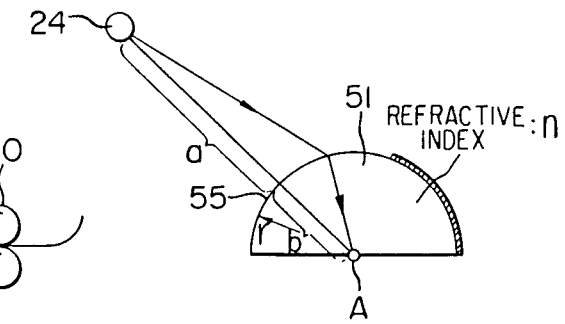

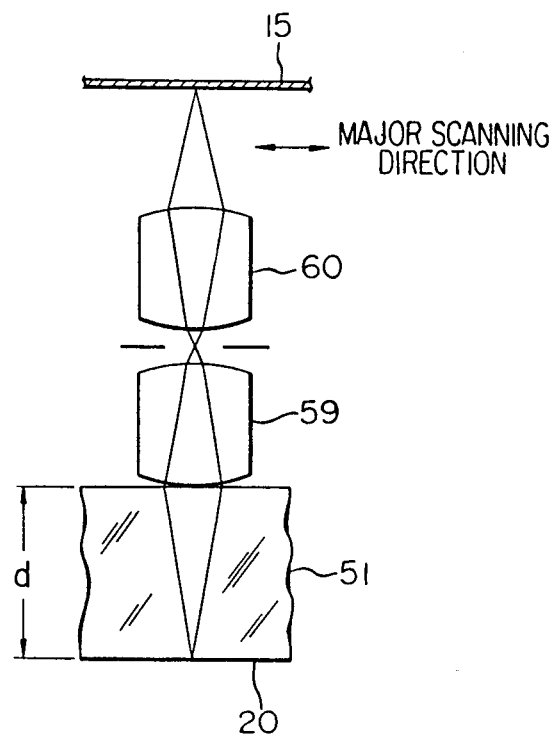
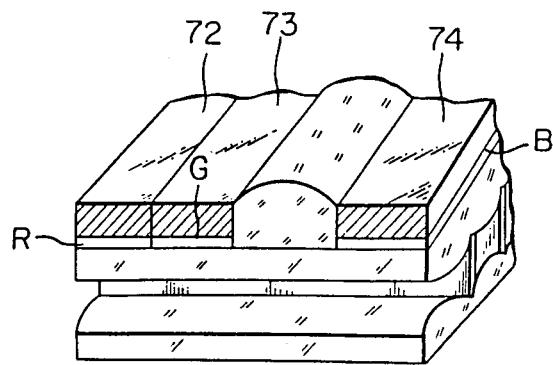

INFORMATION DETECTING APPARATUS

This is a division of application Ser. No. 464,579, filed Feb. 7, 1983, now U.S. Pat. No. 4,467,195 which is a continuation of application Ser. No. 244,259, filed Mar. 16, 1981, now abandoned, which in turn in a continuation of application Ser. No. 967,392, filed Dec. 7, 1978, also now abondoned.

BACKGROUND OF THE INVENTION

1. Field of the Invention

This invention relates to a reader apparatus which converts information of an original surface or a surface to be examined into an electrical signal and reads the same. The apparatus of the present invention is usable with an image information processing apparatus such as facsimile, laser beam printer, ink jet printer or the like and may also be utilized with an apparatus for inspecting the flaw or flaws on the surface of an object. In this specification, the surface including the surface to be examined such as the surface whose flaw is to be inspected is referred to the original surface.

2. Description of the Prior Art

There are various methods of optically reading the information on an original surface, and for example, one of them is the method using a flying spot, but the method to which the present invention pertains comprises illuminating a line on an original surface 1, as shown in FIG. 1 of the accompanying drawings, converting the dispersion light 4 therefrom into an electrical signal by a photoelectric sensor 5 and moving the illuminated line relative to the original surface to thereby two-dimensionally read the information on the original surface. A most basic apparatus of this type is disclosed in U.S. Pat. No. 3,489,909. With this apparatus, the illumination of the line is effected by the use of a cylindrical lens and the information on the illuminated line is integrated to obtain an information signal for inspecting the flaw. In contrast, there is an apparatus as shown in U.S. Pat. No. 3,588,513 which uses a head comprising a plurality of photoelectric transducers arranged in the direction of the line to enhance the resolution in the direction of the illuminated line. However, according to the prior art, it has been impossible to make a photoelectric transducer having a resolution below 1 mm for the usual original width of 20 to 40 cm while, on the other hand, a solid photographing element of high resolving power such as one-dimensional charge coupled device (CCD) could only be several centimeters in length and therefore, in order to read the information on the original surface at a high resolving power, a reduced image of the illuminated line on the original surface had to be formed on the solid photographing element by the use of a reducing optical system and then photoelectrically converted.

However, the apparatus for forming a reduced image of the illuminated line on a solid photographing element of high resolving power by the use of a reducing optical system and photoelectrically converting the same has required a long conjugate distance for image formation between the original surface and the solid photographing element which has in turn led to the larger size of the apparatus and moreover, the finite opening of the reducing optical system has resulted in a decreased quantity of the image plane light on the solid photographing element surface, which has also led to a reduced sensitivity, and, in addition, the quantity of the image plane light has been decreased as it departs from the optic axis, thus making it impossible to maintain a uniform sensitivity.

However, due to the recent advancement of the technique, photoelectric sensors have been developed which are of high resolving power, namely, which enable sensor elements which are the minimum unit capable of separating and reading information light to be minute and which enables a very long footage to be achieved. It has thus become possible to realize a novel form of apparatus which uses such photoelectric sensors instead of the reducing optical system to read information on the original surface.

SUMMARY OF THE INVENTION

It is an object of the present invention to provide an original reading apparatus which is compact and which does not use a reducing optical system.

It is a further object of the present invention to provide an original reading apparatus which is high in sensitivity and which is of high resolution.

It is still a further object of the present invention to provide an apparatus of the type which is in intimate contact with an original and which can always read at a predetermined sensitivity with the distance between the original surface and the surface of the photoelectric sensor being always maintained constant.

It is a further object of the present invention to provide an apparatus which is of high resolution and which can read color information.

The invention will become more fully apparent from the following detailed description thereof taken in conjunction with the accompanying drawings.

BRIEF DESCRIPTION OF THE DRAWINGS

FIGS. 5A, 5B and 5C show an apparatus according to a second embodiment of the present invention.

FIG. 6 illustrates the image formation relationship of the cylindrical body in the apparatus shown in FIG. 5A.

FIGS. 7A, 7B and 7C show an apparatus according to a third embodiment of the present invention.

FIG. 10 shows the image formation relationship of the erect equal magnification optical system shown in FIG. 9.

FIG. 15 shows an embodiment of the apparatus which reads color information.

DESCRIPTION OF THE PREFERRED EMBODIMENTS

Embodiments of the present invention use as the photoelectric sensor a high resolution photoelectric sensor in which the length of the sensor elements in the direction of array may be of a long footage to a short footage, and a sensor array, such as thin film photodiode array of Se-As-Te non-crystalline semiconductor or Silicon non-crystalline semiconductor is applicable as such sensor and this exhibits an excellent photoelectric conversion characteristic in the range of visible wavelength and can be readily made into a long footage by the vacuum evaporation method. Although it is a thin film, it exhibits a quick response and has a feature that it is chemically stable in the air.

Figure 1:
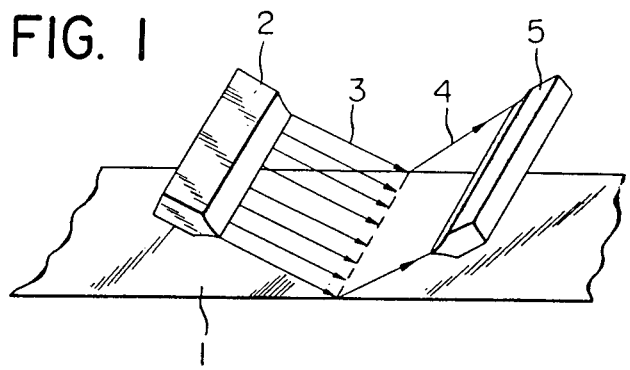
FIG. 1 shows the original reading apparatus according to the prior art.
Figure 2:
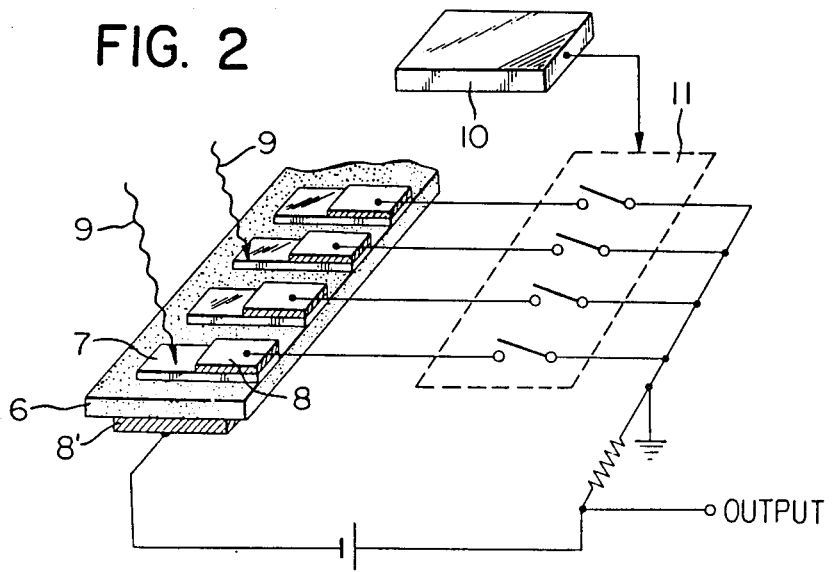
FIG. 2 shows a photoelectric sensor which is of high resolving power and long in footage.

FIG. 2 illustrates a photoelectric sensor array using the above-described non-crystalline semiconductor. A noncrystalline semiconductor 6 which is a thin film photodiode is held between transparent electrodes 7 and metal electrodes 8, 8' as junction terminals to form a sensor element and it is in the form of an array over the width of an original. Hereinafter in the present specification, the direction of the element array will be referred to as the major scanning direction and the direction perpendicular to the major scanning direction will be referred to as the minor scanning direction. The size of these photoelectric sensor elements and the pitch between the elements are determined so as to satisfy the resolution necessary to read the original. When light 9 falls on the photoelectric sensor, only that part of the light which impinges on the non-crystalline semiconductor 6 through the transparent electrodes 7 is photoelectrically converted and the information thereof is taken out by a switching circuit 11 controlled by a driving circuit 10. In this manner, the original information corresponding to one line may be taken out as a timer series signal from the photoelectric sensor.

Figure 3A:
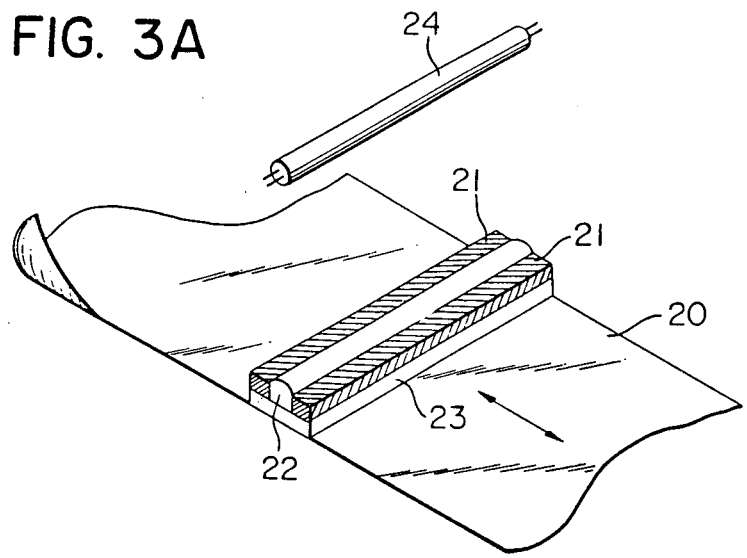
FIGS. 3A and 3B show an apparatus according to a first embodiment of the present invention.
Figure 3B:
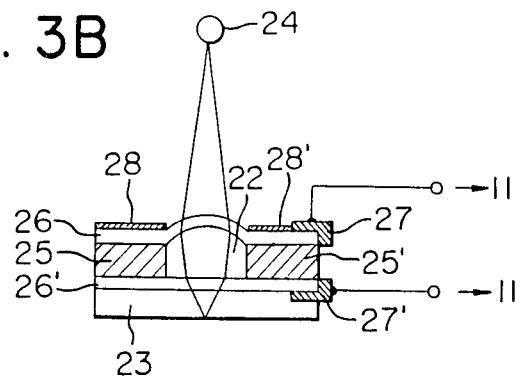

FIGS. 3A and 3B show the apparatus according to a first embodiment of the present invention. FIG. 3A is an overall view of the apparatus and FIG. 3B is a cross-sectional view of the apparatus. In FIG. 3, the apparatus comprises a transparent carrier 23 disposed in intimate contact with an original 20, a cylindrical lens 22 having a bus-line in the major scanning direction and forming on the surface of the original the linear image of a linear light source 24 disposed parallel to the major scanning direction, and two rows of one-dimensional array of photoelectric sensors 21 disposed in the major scanning direction. These members are integrally combined.

In the present embodiment, the linear light source 24 should desirably be as thin as possible to increase the resolution in the minor scanning direction and may be a linear halogen light source or a xenon light source having a small tube diameter. The transparent carrier 23 should desirably be of a material having a good contact characteristic and a high wear-resistant property, and the surface of the carrier 23 which contacts the original 20 may have a curvature to enhance its contact characteristic. The photoelectric sensor 21 may be that shown in FIG. 2A and, as shown in FIG. 3B, it comprises non-crystalline semiconductors 25, 25', transparent electrodes 26, 26' holding the semiconductors therebetween, metal electrodes 27, 27' connected to the transparent electrodes, and opaque insulators 28, 28' for intercepting the light impinging directly on the non-crystalline semiconductors from the light source 24. In this photoelectric sensor, the non-crystalline semiconductors are divided into two by the cylindrical lens 22, but since they are communicated by the transparent electrodes 26 and 26', the metal electrode need by disposed only at one location and the terminal thereof is connected to a switching circuit. In FIG. 3A, each electrode and opaque insulator are not shown in detail.

In the apparatus of such a construction, the illuminating light from the linear light source 24 disposed just above or in the vicinity of the condensing cylindrical lens 22 is condensed by the cylindrical lens 22 to linearly illuminate the surface of the original in the major scanning direction and the direct reflected light which is now information light is again passed through the cylindrical lens and removed thereby, while the dispersion light which is information light impinges on each element of the photoelectric sensor 21. By the timeserial scanning of the photoelectric sensor in the major scanning direction, the reading in the same direction is effected and by relatively moving the apparatus in the minor scanning direction with respect to the original 20, the reading of the whole original is effected. The means for relatively moving the apparatus with respect to the original is not shown.

Figure 4:
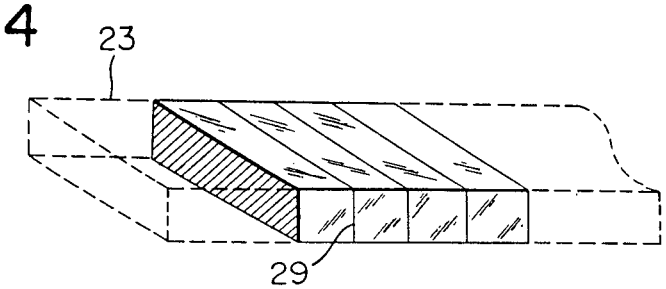
FIG. 4 is an enlarged view of the transparent carrier in FIGS. 3A and 3B.

Thus, in the present embodiment, the information light from the surface of the original can be efficiently sensed and read by the integral, compact apparatus, and the resolution is further enhanced by the following process. First, the resolution in the major scanning direction is enhanced by placing a light intercepting stop 29 corresponding to each element of the photoelectric sensor 21 in the transparent carrier 23 perpendicularly to the major scanning direction, as shown in FIG. 4, thereby eliminating the so-called optical cross-talk which is the phenomenon of the light from a point on the original impinging on a number of elements. The resolution in the major scanning direction, if the thickness of the transparent carrier 23 is small, is determined by the size of each element of the photoelectric sensor and the pitch between the elements, but by providing the light-intercepting stop, it is possible to direct the information light from the surface of the original to each element of the photoelectric sensor without confusion and prevent the resolution from being reduced by scattering of the information light and to make the surface of the light intercepting stop into a reflecting surface to thereby increase the quantity of light impinging on the photoelectric sensor elements. The pitch between the light-intercepting stops is effective even if it is smaller than the pitch between the photoelectric sensor elements.

Secondly, it is also possible to prevent leakage of signals between adjacent units by dividing the non-crystalline into units by patterning, such as edging.

Thirdly, by adjusting the thickness of the transparent carrier and the width of the cylindrical lens in the minor scanning direction, and further by elongating the photoelectric sensor elements in the minor scanning direction, the quantity of light received may be increased. Generally, to increase the quantity of light received, the solid angle at which the illuminating point looks up at the light receiving surface of the photoelectric sensor element may be increased and this may be achieved as by thinning the transparent carrier to make the surface of the photoelectric sensor more proximate to the illuminating point and widening the light-receiving area of the photoelectric sensor elements. In this case, the length of the photoelectric sensor elements in the minor scanning direction does not affect the resolving power in the major scanning direction, and therefore, it is possible to increase the said length of the photoelectric sensor elements and increase the quantity of light received to further thin the pitch between the photoelectric sensor elements in the major scanning direction and enhance the resolution. However, since the secondary and tertiary reflected lights between the surface of the original and the photoelectric sensor surface provide noise, an indiscreetly increased length of the photoelectric sensor elements in the minor scanning direction would result in increased noise, but such noise could be prevented to some extent by providing an anti-reflection coat on the surface of the photoelectric sensor.

Also, the information on the same line can be read at the same time by the two rows of one-dimensional photoelectric sensors and thus, the sensitivity can be increased.

Description will now be made of an embodiment in which the resolution is further enhanced. An enhanced resolution may be achieved by forming the image of the original surface on the surface of the photoelectric sensor, but if an ordinary optical system having only one optic axis is used as the image forming system, the conjugate distance will be too long to achieve the purpose of the present invention. In the embodiment now to be described, such a drawback is overcome by using an ommateal lens. Where an ommateal lens system is used, the conjugate distance may be reduced by an amount corresponding thereto and as a result, the quantity of image plane light is increased and the irregular reading can be overcome by increasing the number of lenses. However, when the conjugate distance can be reduced, means for taking in the illuminating light offers a problem in making the apparatus more compact. That is, the illuminating light must be sufficiently taken in to read the surface of the original with a high sensitivity and this requires a sufficient space to be maintained between the apparatus and the surface of the original, which in turn prevents the apparatus from being compact.

In the present embodiment, to overcome the above-noted difficulty, the illuminating light is taken in directly through an ommateal lens, but in order to prevent occurrence of irregular illumination resulting from the illuminating light being affected by the dispersing action of the ommateal lens, a cylindrical lens array having a bus-line perpendicular to the aforesaid major scanning direction is used as the ommateal lens disposed between the illuminating means and the surface of the original.

Figure 5A:
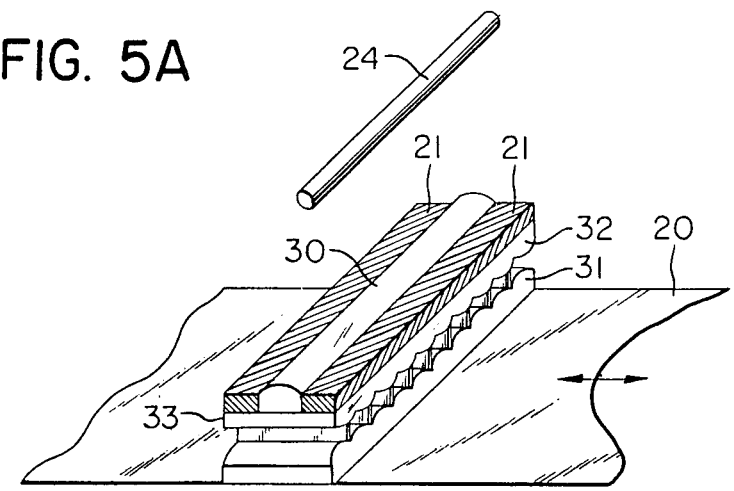

In FIG. 5A, the apparatus, if described in order from the original 20, comprises two layers of cylindrical lens arrays 31 and 32 in which cylindrical lenses having bus-lines parallel to a predetermined minor scanning direction are arrayed in the major scanning direction perpendicular to the minor scanning direction, a douser array 33 disposed between the two layers of lens arrays and having each douser disposed perpendicularly to the major scanning direction, two rows of one-dimensional photoelectric sensors 21 arrayed in the major scanning direction, and a condensing cylindrical lens 30 having a bus-line in the major scanning direction. These members are integrally combined together.

Figure 5B:
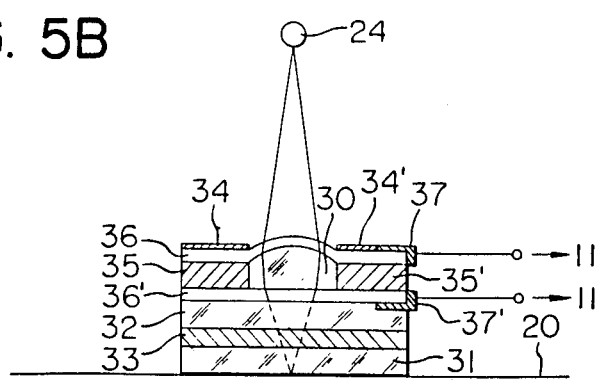

Referring to FIG. 5B which is a view of the FIG. 5A apparatus as seen in the major scanning direction, the photoelectric sensor comprises non-crystalline semiconductors 35, 35', transparent electrodes 36, 36' holding the semiconductors therebetween, metal electrodes 37, 37' connected to the transparent electrodes, and opaque insulators 34, 34' for intercepting the direct light from a linear light source 24. In this photoelectric sensor, the non-crystalline semiconductors are divided into two by the condensing cylindrical lens 30, but since they are communicated with each other by the transparent electrodes 36, 36', the metal electrodes need be disposed only at one location and the terminal thereof is connected to a switching circuit. In FIGS. 5A and 5B, each electrode and opaque insulator are not shown in detail.

As shown in FIG. 5C which is a view of the apparatus as seen in the minor scanning direction, the two layers of cylindrical lens arrays 31 and 32 are arrayed in the major scanning direction and have the same pitch. Between these two layers of arrays, there are disposed dousers 33 having the same pitch and having a surface perpendicular to the major scanning direction.

The process of reading in the apparatus of such construction will now be described in connection with FIG. 5B. The illuminating light from the linear light source 24 disposed just above or in the vicinity of the condensing cylindrical lens 30 is condensed by the cylindrical lens 30 to linearly illuminate the surface of the original in the major scanning direction and the direct reflected light which is non-information light is again passed through the cylindrical lens and removed thereby while the dispersion light which is information light impinges on each element of the photoelectric sensor 21. In that case, the illuminating light to the surface of the original and the reflected light from the surface of the original pass through the two layers of cylindrical lens arrays 31 and 32, respectively, in the major scanning direction but since the cylindrical lens arrays have their bus-line in the minor scanning direction, they have no power in that direction and as the result, they hardly affect the condensing action of the cylindrical lens 30 and the light beam from the surface of the original remains to be dispersion light with respect to the minor scanning direction and reaches the surface of the photoelectric sensor.

The optical relationship of the major scanning direction will now be described in conjunction with FIG. 6. In FIGS. 5C and 6, the cylindrical lens array 31 and the surface of the original are shown to be slightly separate from each other for the purpose of illustration. A picture 40 on the surface of the original is formed as an inverted image 41 by a lens 38 of the cylindrical lens array having a magnification $\beta = -1/a$ (a is a predetermined constant) for the picture, and an equal magnification erect image 42 is formed on the surface of the photoelectric sensor by a lens 39 of the cylindrical lens array having a magnification $\beta' = -a$ for the inverted image 41. The line image of the whole original is formed by the whole cylindrical lens group. By such two layers of cylindrical lens arrays, the information in the major scanning direction of the original surface is reproduced on the surface of the photoelectric sensor and enhanced in resolution. The illuminating light is affected by the power of the cylindrical lens group for the major scanning direction, but due to the above-described optical relationship, it can illuminate the original surface substantially uniformly.

Further, in the present embodiment, the resolution is enhanced by the following process. First, as shown in FIG. 5C, a douser 33 is placed between the two layers of cylindrical lens arrays perpendicularly to the major scanning direction, thereby preventing reduction in the resolution in the major scanning direction by the dispersion of the information light from the original surface. Secondly, the quantity of light received is increased by increasing the length of the photoelectric sensor element in the minor scanning direction. This is attributable to the reason that the length in the minor scanning direction does not affect the resolving power in the major scanning direction. However, the secondary and tertiary reflected lights between the original surface and the surface of the photoelectric sensor provide noise light and therefore, the photoelectric sensor element cannot be indiscreetly long in the minor scanning direction, but high degrees of reflected light can be prevented to some extent by providing an anti-reflection coat on the surface of the photoelectric sensor.

Reading is effected with this apparatus moved relative to the original with respect to the minor scanning direction, but the means for so moving the apparatus is not shown.

In the present embodiment, the cylindrical lens arrays may be provided in any number of layers if they keep the original surface and the photoelectric sensor surface in conjugate relationship, and the pitch in the major scanning direction need not depend on the pitch of the photoelectric sensor elements and may safely be a large pitch. Further, in the present embodiment, the photoelectric sensors need not necessarily be provided on the opposite sides of the condensing cylindrical lens but may be provided only at one side if it is permitted in terms of sensitivity.

Also, a color filter may be disposed on the light-receiving surface of the photoelectric sensor at one side to enable color information to be read.

FIG. 7A shows another embodiment of the present invention. Again in this embodiment, an image forming optical system of an erect equal magnification is disposed between the photoelectric sensor and the original surface with respect at least to the major scanning direction, and the original surface and the surface of the photosensor array are disposed at a conjugate position. Therefore, on the photosensor array, the image of the original surface is formed in the condition of erect and equal magnification at least in the major scanning direction. Also, since this optical system is an erect, equal magnification image forming optical system, the original surface and the photoelectric sensor surface always maintain the image formation relation of 1:1 in the whole line in the major scanning direction even if this optical system is formed by an ommateal optical system.

Further, in the apparatus of FIG. 7A, a cylindrical body is disposed between the image forming optical system and the original surface and illuminating light is effectively taken in with one of the sides thereof as the incidence window, and the original may always be pressed by the cylindrical body to prevent out-of-focus of the original image on the photoelectric sensor surface during the scanning and provide stabilization of the reading accuracy.

In FIG. 7A, the apparatus comprises a light source 24, a transparent cylindrical body 51 disposed in intimate contact with an original 20, a one-dimensional, erect equal magnification lens group 52 secured to the upper surface of the cylindrical lens body 51 and arrayed in the major scanning direction, and photoelectric sensors 53 one-dimensionally arrayed also in the major scanning direction. Here, the one-dimensional erect equal magnification lens means a lens having a property of forming an erect equal magnification image in a predetermined one-dimensional direction. In the apparatus of FIG. 7A, the photoelectric sensors 53, the erect equal magnification lens group 52 and the cylindrical lens body 51 are made integral by a carrier member (not shown).

FIG. 7B is a cross-sectional view of the apparatus of FIG. 7A taken on a plane perpendicular to the major scanning direction. The original 20 is fed in the minor scanning direction by a set of rollers 50. The illuminating light from the light source 24 enters the cylindrical lens body 51 through one side 55 thereof but is condensed by the power of the side 55 having a radius $\gamma$ of curvature and illuminates a narrow line on the original surface parallel to the major scanning line. The information light dispersed on the original surface enters the one-dimensional, erect equal magnification lens group 52. Each of the one-dimensional, erect equal magnification lenses has a power for keeping the original surface and the photoelectric sensor surface in erect equal magnification relation in the major scanning direction but condensing the information light from the original surface onto the photoelectric sensor surface with respect to the minor scanning direction. This is because, in the two-dimensional scanning system like the present embodiment, the photoelectric sensor reads only one amount of information with respect to minor scanning direction and therefore the erect equal magnification relation in the minor scanning direction is not particularly necessary but it is desirable to provide a light condensing action in order to increase the reading sensitivity.

The resolution in the minor scanning direction depends on from how thin line portion of the original surface a high quantity of information light is obtained in that direction. Therefore, in the cross-section of FIG. 7B, it is desirable that the illuminating light be condensed at a point on the original surface as much as possible and for that purpose, the linear light source 24 may be installed so that its relative position to the cylindrical body 51 is not varied during the scanning in the minor scanning direction, and may be set so that the position of the linear light source and the reading line A are in conjugate relationship with the refracting action of the side surface 55 of the cylindrical body. For example, as shown in FIG. 7C, assuming that the reading line A which is the illuminating position lies on the optic axis passing through the linear light source 24 and the center of curvature of the side surface 55, the curvature of the side surface 55 and the position of the linear light source 24 are determined so as to satisfy the relation given by $$\gamma = ab/(a+b)(n-1)$$

where n is the refractive index of the cylindrical body, $\gamma$ is the radius of curvature of the side surface 55, a is the distance on the optic axis from the linear light source to the side surface 55 and b is the distance on the optic axis from the reading line A to the side surface 55. At this time, the image of the linear light source 24 is formed as a line on the original surface. However, this image forming action takes place only in the minor scanning direction and dispersion light intactly illuminates with respect to the major scanning direction and therefore, the irregularity of the brightness of the light source does not result in the irregularity of the illumination on the original surface.

Further, as shown in FIG. 7B, in the minor scanning direction, the photoelectric sensor is positioned in a direction deviated from the regular reflecting direction with respect to the illuminating light to sense the information dispersion light and then, the regular reflected light which is non-information light from the original surface is further reflected by a side surface 56 coated with reflecting film, and the side surface 56 is formed so as to have a curvature about the reading line A, whereby the regular reflected light is again condensed at the reading line A to increase the illumination thereat. Generally, the side surfaces 55 and 56 need not be of the same curvature and such a cylindrical body may be readily made by pressing plastics.

In the present embodiment, to enhance the resolution in the minor scanning direction, a slit plate 57 formed of a light absorbent material is disposed on that surface of the cylindrical body which is adjacent to the original, as shown in FIG. 7B. This slit is parallel to the major scanning direction and prevents the reflected light from the other places than the reading line from impinging on the photoelectric sensor.

Reading in the major scanning direction will now be described. A plurality of one-dimensional erect equal magnification lenses 52 disposed between the original and the photoelectric sensor each form the erect equal magnification image of the original surface on the surface of the photoelectric sensor in the major scanning direction. Therefore, even if they are ommateal lenses, the original surface and the photoelectric sensor always maintain the image formation relationship of 1:1. Incidentally, in the reading apparatus of such construction, the resolving power in the major scanning direction during the reading depends on the magnitude of the pitch of the photoelectric sensor array and the smaller the pitch of the photoelectric sensor array, the higher resolving power the reading apparatus has. Also, each element of the photoelectric sensor is very small but since the surface of the photoelectric sensor and the surface of the original always correspond to 1:1 due to the erect equal magnification image forming optical system, it is possible to prevent the light beam leaving a point on the original from impinging on any other element than the corresponding element of the photoelectric sensor, thus improving the S/N ratio.

Figure 8:
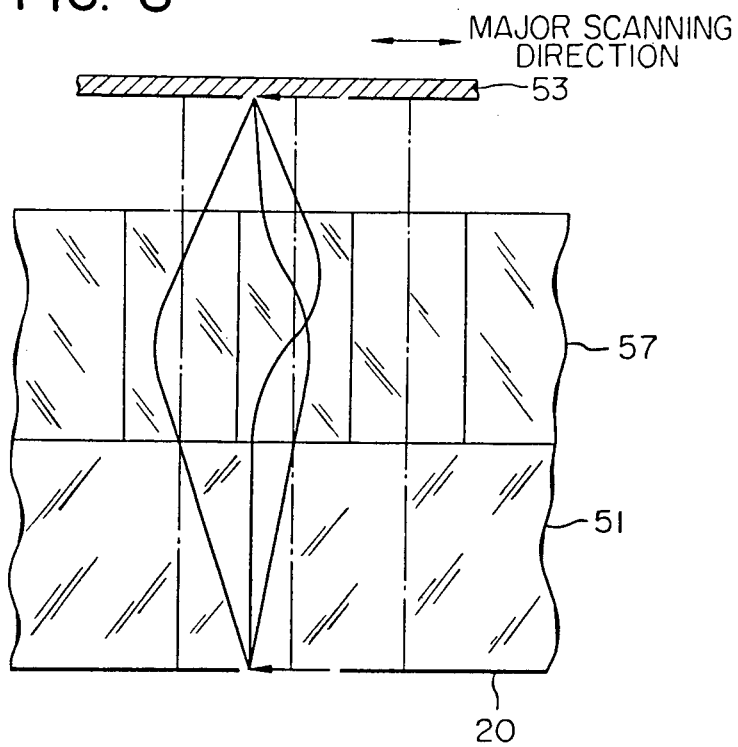
FIGS. 8 and 9 show the erect equal magnification optical system in the apparatus of FIG. 7A.
Figure 9:
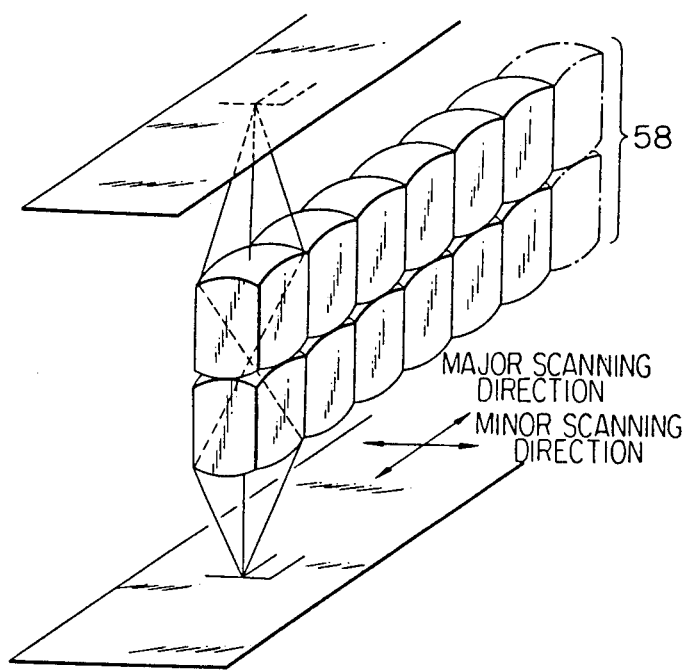

Since the one-dimensional erect equal magnification optical system formed by the above-described ommateal optical system may be provided by an optical system of relatively short focal length, the reading apparatus can be readily made compact. FIG. 8 shows the image formation relationship between the original surface and the photoelectric sensor surface in case where a lens whose refractive index is varied in accordance with the distance from the center axis is used as the one-dimensional erect equal magnification lens. In the present embodiment, the cylindrical body presses against the original, so that the clearance between the lens surface and the original surface is always maintained constant and an out-of-focus image does not occur. FIG. 9 shows an example which uses as the one-dimensional erect equal magnification lens the bar lens as described in our copending Japanese Patent Application No. 373115/1977. The bar lens shown in FIG. 9 has an erect equal magnification relationship in the minor scanning direction, as well, but this is not a requisite condition as already noted. Describing the image formation relationship in the major scanning direction by reference to FIG. 10, each picture element of the original surface forms an inverted image of lateral magnification $\beta_1 = -1/a$ (a is any given constant) with the aid of a lens 59, and further a lens 60 causes the inverted image to be formed on the photoelectric sensor surface at a lateral magnification $\beta_2 = -a$. Therefore, an erect equal magnification image of each line of the original surface is formed on the photoelectric sensor surface. Besides this, various lens systems such as the ommateal lens described in U.S. Pat. No. 3,584,950 may be used as the erect equal magnification optical system.

As can be seen in FIGS. 8 and 10, strictly, displacement of the focusing point takes place in these optical systems because of the presence of such cylindrical body between them and the original surface. Such displacement must be corrected in advance. In the case of the lens shown in FIG. 8, the cylindrical body between the lens and the original surface is in intimate contact with the end face of the lens which is adjacent to the original. Therefore, if the clearance between the lens and the original surface is filled with a cylindrical body of refractive index n and thickness d, then the length of such medium converted in terms of air is given as d/n, and it will suffice for this amount to become the optical distance which will fill up the previously described erect equal magnification system. That is, where the cylindrical body 51 is not placed in, if the distance from the end face of the erect equal magnification lens which is adjacent to the original to the original surface for satisfying the erect equal magnification relationship is l, and if the clearance between the lens and the original surface is filled with a cylindrical body of refractive index n, the thickness d of the cylindrical body may be given as $$d = nl$$

from $d/n = l$.

This is also the case with FIG. 10, but the end face adjacent to the original surface which corresponds to the surface of the lens has a curvature, so that the cylindrical body 51 must be placed with the air gap more or less maintained. Again in this case, the end face of the cylindrical body 51 which is adjacent to the lens is planar. The lens must have its spherical aberration corrected by an amount corresponding to the thickness of this air gap.

Thus, the apparatus shown in FIG. 7A forms the erect equal magnification image of the original on the photoelectric sensor surface to thereby prevent reduction in resolution and also uses a transparent body having a condensing-reflecting side surface for effectively utilizing the illuminating light, thereby reading the original at a high S/N ratio even if the light source is of low brightness. Also, by the transparent body pressing against the original, an erect equal magnification image which is constantly in focus can be obtained and so, the original can be read without irregularity.

In the above-described embodiment, there can be provided a reading apparatus which is of high sensitivity and of high resolution depending on the manner of arrangement of the photoelectric sensor.

Figure 11:
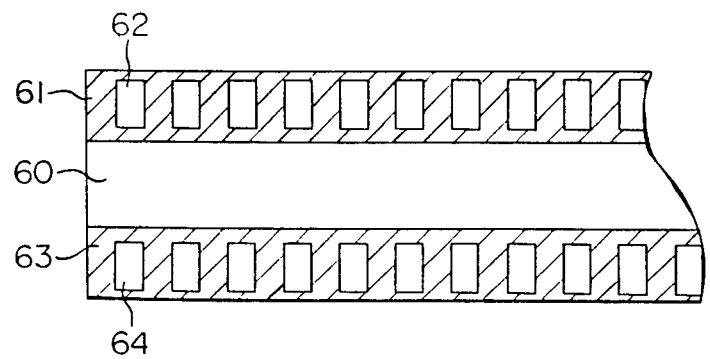
FIGS. 11, 12, 13 and 14 show the arrangement of the photoelectric sensor elements and color filter.
Figure 12:
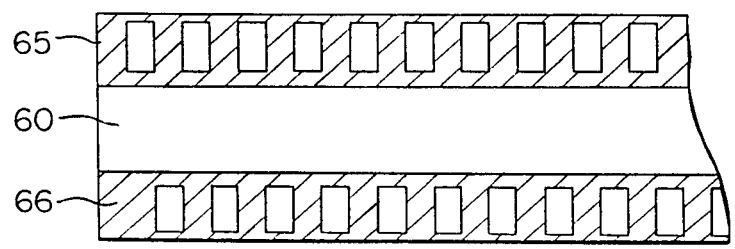

First, as shown in FIG. 11, the elements of one-dimensional photoelectric sensors 61 and 62 disposed on the opposite sides of a condensing cylindrical lens 60 are arrayed parallel to each other, and as shown in FIGS. 3B and 5B, two elements opposed to each other are connected together by a transparent electrode to thereby substantially enlarge the light-receiving surface and enhance the sensitivity. Also, as shown in FIG. 12, one-dimensional photoelectric sensors 65 and 66 may be arrayed in staggered relationship with one of the sensors deviated from the other by half the pitch of one element, thereby providing double the reading resolution.

Figure 13:
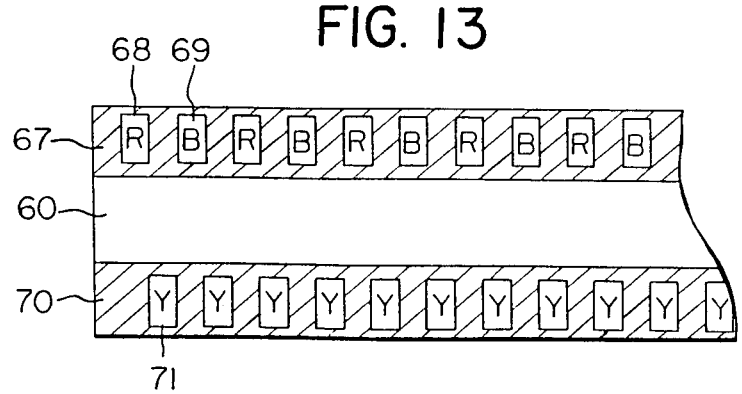

Further, as shown in FIG. 13, a brightness signal filter Y and color signal stripe filters R(red) and B(blue) may be formed on the surface of the photoelectric sensor to thereby enable color information of high resolution to be read. Also, as shown in FIG. 14, three rows of one-dimensional photoelectric sensors may be provided and R(red) filters, G(green) filter and B(blue) filter may be installed on the surfaces of the sensors 72, 73 and 74, respectively, whereby signals of each sensor may be independently read to obtain color information.

In such embodiments wherein two or more rows of one-dimensional photoelectric sensors are disposed on one or both sides of the cylindrical lens to thereby enable the information lights from the illuminated line to be detected at a time, the surface of the original and the surface of the photoelectric sensors are not in optically conjugate relationship in the minor scanning direction. In that case, one-dimensional photoelectric sensors whose elements are arrayed with the same pitch a are arrayed in n rows in the minor scanning direction with the sensors successively deviated by a/n each in the major scanning direction, whereby there may be provided a reading apparatus in which all of the elements can detect the information lights from the corresponding illuminated lines and which is still higher in resolution.

Figure 14:
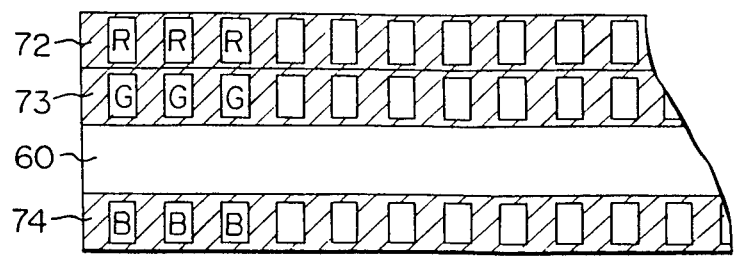

An application of the FIG. 14 photoelectric sensors to the FIG. 5A apparatus is shown in FIG. 15.

Also, when the original is to be read by the use of the apparatus of the present invention, the scanning may be effected with the original fixed and the apparatus moved, instead of fixing the apparatus of FIGS. 3A, 5A or 7A and moving the original in the minor scanning direction.

What we claim is:

1. An information detecting apparatus, comprising:
   a transparent carrier member having a face in contact with an original information-bearing member;
   a light source for illuminating the original member through said transparent carrier member;
   a light-receiving sensor on said transparent carrier member between said light source and the original member, said light-receiving sensor being a substantially one-dimensional array extending in a major scanning direction;
   an opaque member on said transparent carrier member for substantially preventing impingement of light on said light-receiving sensor directly from said light source and for providing substantially one-dimensional illumination of the original member in the major scanning direction; and
   driving means for producing relative movement between said light-receiving sensor and the original member.

* * * * *

UNITED STATES PATENT AND TRADEMARK OFFICE
CERTIFICATE OF CORRECTION

PATENT NO. : 4,553,036

DATED : November 12, 1985

INVENTOR(S) : NAOTO KAWAMURA, ET AL.

It is certified that error appears in the above-identified patent and that said Letters Patent is hereby corrected as shown below:

In the abstract, line 2, change "pictures an" to --pictures and--.

Col. 1, line 7, change "turn in a" to --turn is a--.
Col. 1, line 9, change "abondoned." to --abandoned."
Col. 1, line 14, change "information of" to --information on--.
Col. 1, line 23, change "referred to the" to --referred to as the--.

Col. 2, line 22, change "still a" to --a still--.
Col. 3, line 9, change "noncrystalline" to --non-crystalline--.
Col. 3, line 51, change "FIG. 2A" to --FIG. 3A--.
Col. 4, line 6, change "timeserial" to --time-serial--.
Col. 8, line 42, change "$\gamma=ab/(a+b)(n-1)$" to --$\gamma=\frac{ab}{a+b}\cdot(n-1)$--.

Col. 8, line 15, change "to minor" to --to the minor--.
Col. 11, line 1, change "filter" both occurrences to --filters--.

Signed and Sealed this

Twenty-first Day of October, 1986

[SEAL]

Attest:

DONALD J. QUIGG

Attesting Officer    Commissioner of Patents and Trademarks